United States Patent [19]
Kerskey et al.

[11] Patent Number: 5,915,060
[45] Date of Patent: Jun. 22, 1999

[54] LIGHT PIPE ARRAY

[75] Inventors: Alan Kerskey, Ponpano Beach; Ronald Bruce Smith, Wellington, both of Fla.

[73] Assignee: AIWA Co., Ltd., Tokyo, Japan

[21] Appl. No.: 08/932,902

[22] Filed: Sep. 17, 1997

[51] Int. Cl.$^6$ .................................................. G02B 6/00
[52] U.S. Cl. ................................................................ 385/133
[58] Field of Search .................................... 385/133, 147, 385/88, 92, 901, 89; 362/551, 488; 345/82, 102; 349/62; 359/350; 422/102, 119

[56] References Cited

U.S. PATENT DOCUMENTS

| | | | |
|---|---|---|---|
| 4,772,769 | 9/1988 | Shumate | 200/314 |
| 4,826,273 | 5/1989 | Tinder et al. | 362/488 |
| 5,054,869 | 10/1991 | Doyle | 385/133 |
| 5,548,676 | 8/1996 | Savage, Jr. | 385/88 |
| 5,603,283 | 2/1997 | Owen | 116/284 |
| 5,670,118 | 9/1997 | Sponholtz | 422/102 |
| 5,760,754 | 6/1998 | Amero, Jr. et al. | 345/82 |

*Primary Examiner*—Akm E. Ullah
*Attorney, Agent, or Firm*—Graham & James LLP

[57] ABSTRACT

A light pipe array includes a series of light pipes connected to a runner. The light pipes and runner are preferably molded as a single piece using a clear or transparent plastic. The runner is fabricated to have a relatively small cross-section when compared to the light pipes. The interconnection between the runner and each light pipe is chosen so that each light pipe is oriented to be substantially perpendicular to the runner. Additionally, the interconnection between the runner and each light pipes is chosen so that the runner is in close proximity to the light ray exit end of each light pipe. The small cross-section of the runner, the perpendicular relationship between the runner and the light pipes and the location of the connection between the runner and the light pipes provides a light pipe array exhibiting little or no contamination between the included light pipes.

19 Claims, 3 Drawing Sheets

Fig. 1
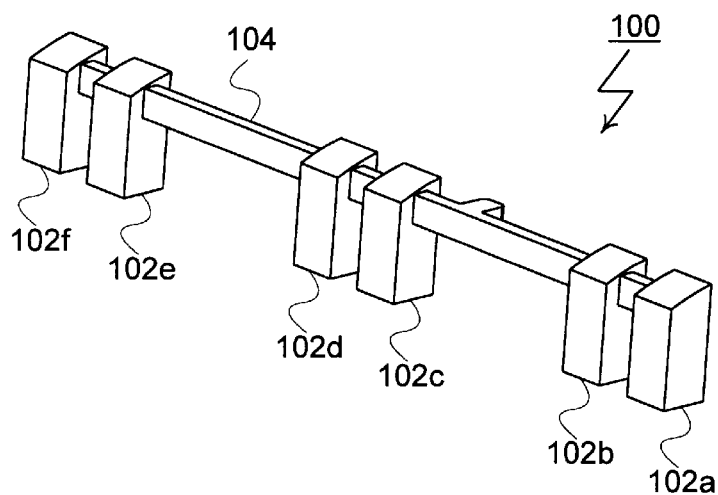
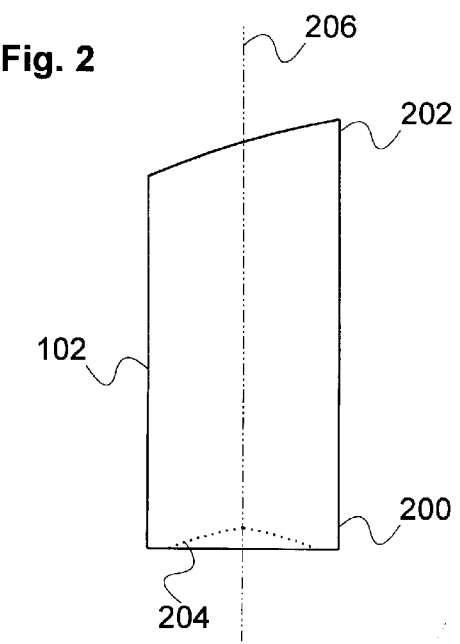
Fig. 2

LIGHT PIPE ARRAY

FIELD OF THE INVENTION

The present invention relates generally to systems for transmitting light over distances. More specifically, the present invention includes a single-piece molded array of light pipes exhibiting extremely low optical contamination between the light pipes included in the array.

BACKGROUND OF THE INVENTION

Light pipes are devices that are used to transmit light over relatively short distances. Typically, light pipes are fabricated as clear glass or plastic rods. Light entering one end of a light pipe travels the length of the rod and is emitted at the rod's opposite end.

Light pipes are used in numerous applications. For example, it is common for printed circuit boards, disk drives and other components to include status LEDs. When a component of this type is included in a cabinet or other housing, the status LED may not be externally visible. In these cases, a light pipe may be used to convey the light produced by the status LED to a point outside of the cabinet. In this way, the operational status of the component may be assessed without having to open the cabinet.

In many cases, a single application will require a group of light pipes. This occurs, for example, when a printed circuit board or other component includes a group of LEDs. Making these LEDs visible from outside of an enclosing cabinet requires one light pipe for each LED.

To minimize production costs, a group of light pipes may be fabricated as a light pipe array. A light pipe array is an assembly, preferably one-piece, consisting of a group of light pipes joined by an interconnecting portion known as a runner. Light pipe arrays reduce costs by allowing a group of light pipes to be created using a single molding operation. Costs are further reduced because the entire light pipe array is installed as a single assembly.

Unfortunately, in light pipe arrays, there is a tendency for light traveling through a given light pipe to contaminate the remaining light pipes. This contamination occurs because light traveling through any of the light pipes has a tendency to enter the runner interconnecting the light pipes. Once inside the runner, the light enters and contaminates the remaining light pipes.

Contamination degrades the effectiveness of a light pipe array. Specifically, contamination can make a light pipe that is not intended to be illuminated appear to be partially or fully illuminated. Additionally, in cases where adjacent light pipes are intended to carry different colors of light, contamination can cause a blending of colors.

As a result, there is a need for light pipe arrays that can be molded as a single-piece assembly and exhibit little or no contamination between the included light pipes.

SUMMARY OF THE INVENTION

The present invention includes a light pipe array exhibiting little or no contamination between the included light pipes. Structurally, an embodiment of the light pipe array of the present invention includes a group of light pipes joined by an interconnecting runner. The light pipes and the interconnecting runner are fabricated as a single piece. Preferably, this fabrication will be performed by molding a clear or transparent plastic material such as Acrylic or Lexan.

Each light pipe included in the light pipe array is shaped as a rod having a square, circular or rectangular cross-section. Each rod has two ends: a light ray entry end and a light ray exit end. The light ray entry end of each rod is shaped to include a concave dimple. The dimple gathers light directed at the light ray entry end into the rod. This increases the ability of the rod to capture light. Once inside the rod, light travels through the light pipe and is emitted at the light ray exit end.

The light pipes in the light pipe array are disposed in a pattern. The pattern is implementation dependent. Thus, for some cases the light pipes will be disposed in a single-file linear pattern. In other cases, it may be desirable to use a zig-zag pattern or other pattern.

The runner connects each light pipe in the pattern to one or more other light pipes. Typically, each light pipe (except the first and last light pipes in the pattern) will be connected to a preceding light pipe and a following light pipe. Other patterns of interconnection are, however, suitable for the purposes of the present invention. The runner is fabricated to have a relatively small cross-section. Preferably, the runner is dimensioned so that it has a cross-sectional area that is at maximum 19.5 percent of the cross-sectional area of then light tube.

The interconnection between the runner and each light pipe is chosen so that each light pipe is oriented to be substantially perpendicular to the runner. Additionally, the interconnection between the runner and each light pipes is chosen so that the runner is in close proximity to the light ray exit end of each light pipe.

In use, the small cross-sectional area of the runner reduces the tendency for light in the light pipes to enter the runner. This tendency is further reduced by the substantially perpendicular relationship of the runner and light pipes. The tendency is reduced still further by the close proximity of the runner to the light ray exit end of each light pipe. As a result, the present invention provides a light pipe array exhibiting little or no contamination between the included light pipes.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 1 is an isometric view of a light pipe array according to a preferred embodiment of the present invention.

FIG. 2 is a side view of an individual light pipe as used in a preferred embodiment of the present invention.

DETAILED DESCRIPTION OF THE PREFERRED EMBODIMENTS

Figure 3A:
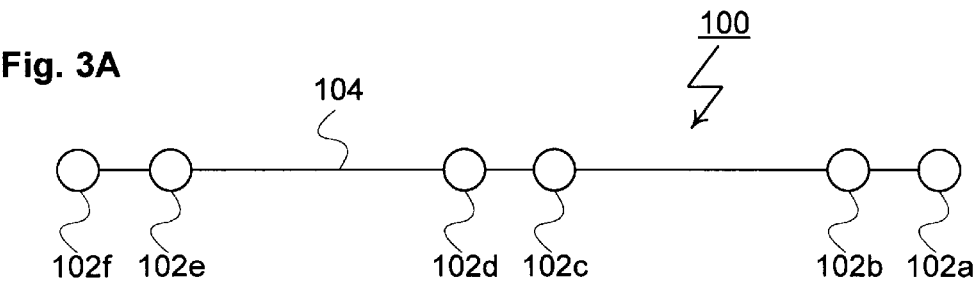
FIG. 3A is a block diagram of a linear pattern of light pipes shown as a first representative pattern for a light pipe array according to a preferred embodiment of the present invention.

Reference will now be made in detail to preferred embodiments of the invention, examples of which are illustrated in the accompanying drawings. Wherever convenient, the same reference numbers will be used throughout the drawings to refer to the same or like parts.

The present invention includes a light pipe array exhibiting little or no contamination between the included light pipes. In FIG. 1, a representative embodiment of the light pipe array of the present invention is shown and generally designated 100. Structurally, light pipe array 100 includes a series of light pipes, of which light pipes 102a through 102f are representative. Light pipe array 100 also includes a runner 104 connecting light pipes 102 into a single assembly. Preferably, light pipe array 100 is fabricated as a single piece by molding a clear or transparent plastic, such as Acrylic or Lexan. Alternately, light pipe array 100 may be fabricated by machining or by any other suitable fabrication technique.

The structural details of light pipes 102 are more easily appreciated by reference to FIG. 2. In FIG. 2, it may be seen that each light pipe 102 has a light ray entry end 200 and a light ray exit end 202. Light ray entry end 200 is preferably shaped to include a concave dimple 204. Dimple 204 acts as a lens and gathers light directed at light ray entry end 200 into light pipe 102. Preferably, dimple 204 is shaped to create a parabolic lens to enhance the light gathering ability of light pipe 102. Operationally, if light ray entry end 200 is positioned to be adjacent to an LED, dimple 204 will act to gather light from the LED into light pipe 102. Once inside light pipe 102, light travels to light ray exit end 202 and is emitted. Light ray exit end 202 may be contoured to have various shapes. Thus, in the drawings, light ray exit end 202 has a sloping shape, allowing light ray exit end 202 to match the contour of a sloping bezel. For the purposes of description, light pipe 102 is shown to have a longitudinal axis 206.

Referring again to FIG. 1, it may be seen that the various light pipes 102 are disposed in a single-file linear pattern. It should be appreciated that this pattern is intended to be representative in nature and that other patterns are equally practical. The use of different patterns is better appreciated by comparison of FIG. 3A which shows light pipes 102 disposed in a single-file linear pattern, with FIGS. 3B and 3C which show light pipes 102 disposed in zig-zag and semi-circular patterns, respectively.

Figure 3B:
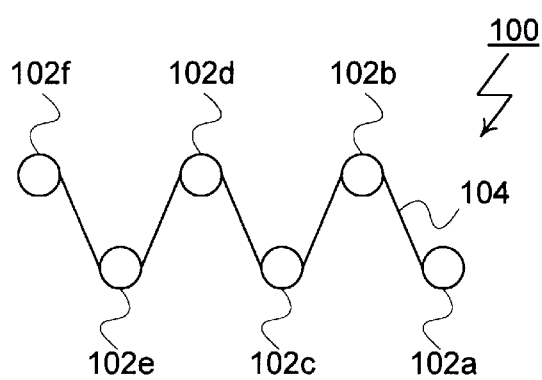
FIG. 3B is a block diagram of a zig-zag pattern of light pipes shown as a second representative pattern for a light pipe array according to a preferred embodiment of the present invention.
Figure 3C:
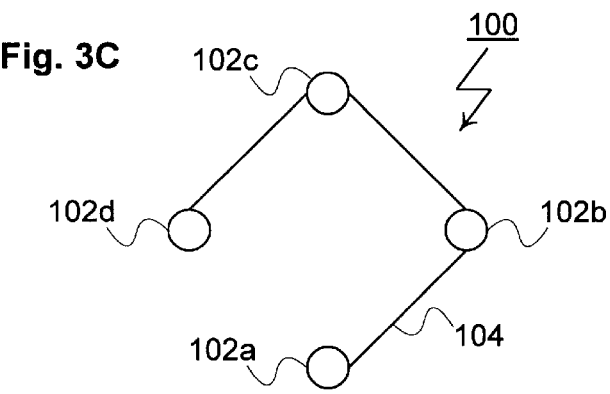
FIG. 3C is a block diagram of a semi-circular pattern of light pipes shown as a third representative pattern for a light pipe array according to a preferred embodiment of the present invention.
Figure 3D:
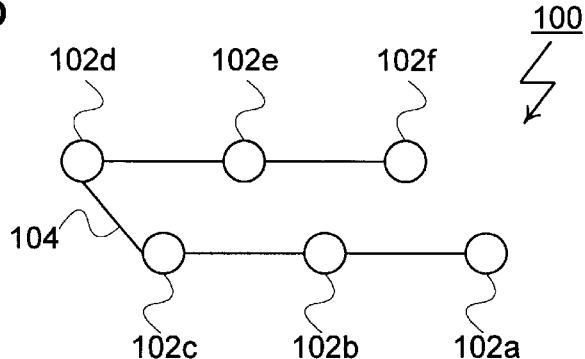
FIG. 3D is a block diagram of a zig-zag pattern of light pipes as shown in FIG. 3B with the light pipes now shown connected using an alternate runner arrangement.

The position of light pipes 102 within the linear patterns of FIGS. 3A through 3C is maintained by runner 104. Effectively, runner 104 forms an interconnection between light pipes 102 and joins light pipes 102 into a single-piece assembly. Typically, each light pipe 102 (except the first and last light pipes 102 in the pattern) will be connected to a preceding light pipe 102 and a following light pipe 102. Thus, in the case of light pipe array 100 of FIG. 3A, light pipe 102b is connected to preceding light pipe 102a and to following light pipe 102c. Other patterns of interconnection are, however, suitable for the purposes of the present invention. This may be appreciated by reference to FIG. 3D which shows a light pipe array 100 having the zig-zag pattern of FIG. 3B. In the case of FIG. 3D, however, a light pipes 102 are connected in a loop pattern.

Figure 4:
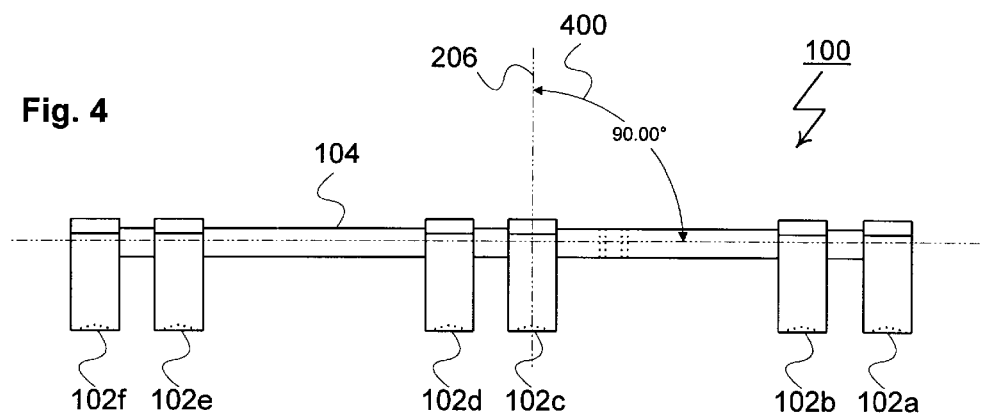
FIG. 4 is a top view of a light pipe array according to a preferred embodiment of the present invention.

Each light pipe 102 included in light pipe array 100 is positioned to be substantially perpendicular to runner 104. This is best appreciated by reference to FIG. 4. In FIG. 4, an angle between longitudinal axis 206 of light pipe 102c and runner 104 is shown and designated 400. For the purposes of the present invention, angle 400 is preferably ninety-degrees (90°). It should be appreciated, however, that the value of ninety-degrees (90°) represents an optimal value. When necessary, angle 400 may depart from the optimal value of ninety-degrees (90°). Preferably, angle 400 should depart the optimal angle of ninety-degrees (90°) by no more than ten degrees (10°) (i.e., 90°±10°). More preferably, angle 400 should depart from the optimal angle of ninety-degrees (90°) by no more than five degrees (5°) (i.e, 90°±5°).

Figure 5:
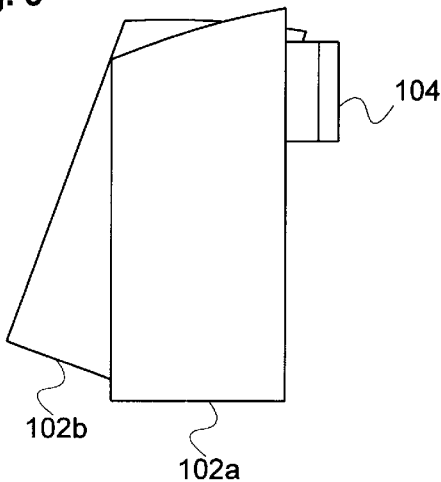
FIG. 5 is an end view of a light pipe array according to a preferred embodiment of the present invention, showing two non-parallel light pipes.

The present invention does not require that light pipes 102 be parallel. This is best appreciated by reference to FIG. 5. In FIG. 5, light pipe array 100 is shown to include light pipes 102a and 102b. As shown, light pipes 102a and 102b are non-parallel and divergent. The ability of the present invention to include non-parallel light pipes 102 increases the flexibility of the present invention.

Figure 6:
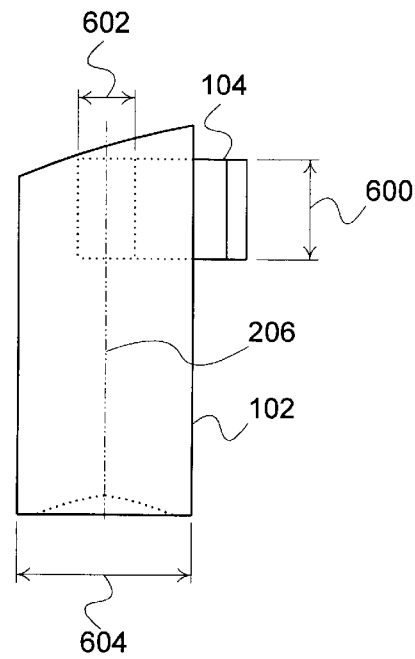
FIG. 6 is an end view of a light pipe array according to a preferred embodiment of the present invention, showing the relative cross-sectional areas of the runner and light pipes.

As mentioned previously, runner 104 is connected to each light pipe 102. Light pipe array 100 is fabricated so that runner 104 is connected to each light pipe 102. A representative connection between a light pipe 102 and runner 104 is shown in FIG. 6. As shown in FIG. 6, the connection between runner 104 and light pipe 102 is in close proximity to light ray exit end 202. In fact, for the purposes of the present invention, is it preferable for runner 104 to connect to light pipe 102 at a point that is immediately adjacent to light ray exit end 202. It should be appreciated, however, that the position immediately adjacent to light ray exit end 202 represents an optimal value. When necessary, runner 104 may be positioned inboard of light ray exit end 202.

Runner 104 is fabricated to have a relatively small cross-section. Preferably, runner 104 is dimensioned so that it has a cross-section area that is at maximum 19.5 percent of the cross-sectional area of light tube 102. This is best appreciated by reference to FIG. 6. In FIG. 6, runner 104 is characterized by a height 600 and a thickness 602. Using these characteristics, the cross-sectional area of runner 104 is calculated as the product of height 600 and thickness 602. Light pipe 102 has a cross-sectional area that is measured on a plane perpendicular to longitudinal axis 206. For the illustrated embodiment this cross-sectional area is calculated as the square of thickness 604 (for the illustrated embodiment, light pipe 102 is assumed to have a square cross-section). For other embodiments, (i.e., where the cross-section of light pipe 102 is rectangular, circular, triangular or otherwise shaped), the calculation of the cross-sectional area of light pipe 102 may be performed using related methods. Based on the calculation of the cross-sectional area of runner 104 and light pipe 102, it is preferably that light pipe 102 and runner 104 be dimensioned so that runner 104 have a cross-sectional area that is at maximum 19.5 percent of the cross-sectional area of light pipe 102.

In use, the small cross-sectional area of runner 104 reduces the tendency for light to leave light pipes 102 and enter runner 104. This tendency is further reduced by the substantially perpendicular relationship of runner 104 and light pipes 102. Effectively, the perpendicular relationship causes light traveling through lights pipes 102 to skim along the small cross-sectional area of runner 104. Reflection by runner 104 is maximized and refraction into runner 104 is minimized. The tendency for light to leave light pipes 102 is reduced still further by the connections between runner 104 and light pipes 102 which are in close proximity to the light ray exit ends of light pipes 102. As a result, light pipe array 100 exhibits little or no contamination between light pipes 100.

Light pipe array 100 also exhibits minimal parasitic loss of light into runner 104. This property may be used whenever a runner is used to attach a light pipe to a larger assembly. Thus, the present invention is not strictly limited to light pipe arrays, but may be useful even for singular light pipes.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A light pipe array comprising:
   a light pipe having a light ray entry end and a light ray exit end, the light pipe having a longitudinal axis passing between the light ray entry end and the light ray exit end, the light pipe being characterized by a light pipe cross-sectional area; and
   a runner, the runner positioned to be substantially perpendicular to the longitudinal axis of the light pipe, the runner attached to the light pipe at a point that is in closer proximity to the light ray exit end than to the light ray entry end, the runner being characterized by a runner cross-sectional area, where the runner cross-sectional area is relatively small when compared to the light pipe cross-sectional area.

2. A light pipe array as recited in claim 1, wherein the runner is attached to the light pipe at a point that is in close proximity to the light ray exit end of the light pipe.

3. A light pipe array as recited in claim 1, wherein the runner is attached to the light pipe at a point that is immediately adjacent to the light ray exit end of the light pipe.

4. A light pipe array as recited in claim 1, wherein the runner has a rectangular cross-section.

5. A light pipe array as recited in claim 1, wherein the light pipe has a square cross-section.

6. A light pipe array as recited in claim 1, wherein the cross-sectional area of the runner is at maximum 19.5 percent of the cross-sectional area of the light pipe.

7. A light pipe array as recited in claim 1, wherein the runner and light pipe are molded as a single-piece using a clear or transparent plastic.

8. A light pipe array as recited in claim 1, wherein the runner is positioned between eighty (80) and one hundred (100) degrees of the longitudinal axis of the light pipe.

9. A light pipe array as recited in claim 1, wherein the runner is positioned between eighty-five (85) and ninety-five (95) degrees of the longitudinal axis of the light pipe.

10. A light pipe array comprising;
    two or more light pipes, each light pipe having a light ray entry end and a light ray exit end, each light pipe having a longitudinal axis passing between the light ray entry end and the light ray exit end, each light pipe being characterized by a light pipe cross-sectional area; and
    a runner attached to each light pipe, each point of attachment between the runner and a respective light pipe being located at a point that is in closer proximity to the light ray exit end than to the light race entry end of the respective light pipes, the runner and the light pipes disposed so that the longitudinal axis of each light pipe is substantially perpendicular to the runner, the runner being characterized by a runner cross-sectional area, where the runner cross-sectional area is relatively small when compared to the cross-sectional area of the light pipes.

11. A light pipe array as recited in claim 10, wherein each point of attachment between the runner and a respective light pipe being located at a point that is in close proximity to the light ray exit end of the respective light pipe.

12. A light pipe array as recited in claim 10, wherein each point of attachment between the runner and a respective light pipe being located at a point that is immediately adjacent to the light ray exit end of the respective light pipe.

13. A light pipe array as recited in claim 10, wherein the runner has a rectangular cross-section.

14. A light pipe array as recited in claim 10, wherein at least some of the light pipes have a square cross-section.

15. A light pipe array as recited in claim 10, wherein the cross-sectional area of each runner is at maximum 19.5 percent of the cross-sectional area of the light pipe.

16. A light pipe array as recited in claim 10, wherein the runner and light pipe are molded as a single-piece using a clear or transparent plastic.

17. A light pipe array as recited in claim 10, wherein the runner is disposed between eighty (80) and one hundred (100) degrees of the longitudinal axis of each of the light pipes.

18. A light pipe array as recited in claim 10, wherein the runner is disposed between eighty-five (85) and ninety-five (95) degrees of the longitudinal axis of each of the light pipes.

19. A system comprising:
    an enclosing cabinet;
    at least one light emitting diode mounted within the cabinet;
    at least one light pipe having a light ray entry end and a light ray exit end, each light pipe having a longitudinal axis passing between the light ray entry end and the light ray exit end, each light pipe being characterized by a light pipe cross-sectional area, the light ray entry end of each light pipe positioned to be adjacent to a respective light emitting diode, the light ray exit end of each light pipe positioned to project light produced by a respective light emitting diode to a position outside of the cabinet; and
    a runner attached to each light pipes, each point of attachment between the runner and a respective light pipe being located at a point that is in closer proximity to the light ray exit end than to the light ray entry end of the respective light pipe, the runner and each light pipe disposed so that the longitudinal axis of each light pipe is substantially perpendicular to the runner, the runner being characterized by a runner cross-sectional area, with the runner cross-sectional area being relatively small when compared to the cross-sectional area of each light pipe.

* * * * *